United States Patent [19]

Noguchi

[11] Patent Number: 5,361,150

[45] Date of Patent: Nov. 1, 1994

[54] ACTIVE MATRIX LIQUID CRYSTAL DISPLAY WITH IDENTIFICATION MARK IN THE LOWER OPAQUE CONDUCTIVE FILM

[75] Inventor: Kesao Noguchi, Tokyo, Japan

[73] Assignee: NEC Corporation, Japan

[21] Appl. No.: 92,669

[22] Filed: Jul. 14, 1993

Related U.S. Application Data

[62] Division of Ser. No. 731,421, Jul. 17, 1991, abandoned.

[30] Foreign Application Priority Data

Jul. 19, 1990 [JP] Japan .................................. 2-192326

[51] Int. Cl.$^5$ .................. G02F 1/1343; G02F 1/1335; G02F 1/1333
[52] U.S. Cl. ........................................ 359/62; 359/87; 359/82
[58] Field of Search ........................ 359/62, 74, 54, 55, 359/56, 57, 58, 59, 87, 82; 283/74, 83, 94; 250/568; 315/169.3

[56] References Cited

U.S. PATENT DOCUMENTS 3,987,418 10/1978 Buchanan ............................ 307/304
4,523,088 6/1985 Utsche et al. ..................... 283/74 X
4,585,931 4/1986 Duncan et al. ..................... 235/464
4,825,093 4/1989 Kriseho et al. .................. 250/568 X
4,930,086 5/1990 Fukasawa ............................ 364/468
5,187,118 2/1993 Ohmori et al. ..................... 437/180

FOREIGN PATENT DOCUMENTS 0234827 9/1989 Japan .................................... 359/87

OTHER PUBLICATIONS

IEEE VLSI Support Technologies Tutorial, 1982, p. 76, FIG. 1 ISBN-0-8186-0386-0.
Mead et al, Introduction to VLSI Systems, 1980, p. 63, FIG. 3.2 ISBN-0-201-04358-0.

Primary Examiner—William L. Sikes
Assistant Examiner—Kenneth Parker
Attorney, Agent, or Firm—Laff, Whitesel, Conte & Saret

[57] ABSTRACT

An active matrix type liquid display device with a display pattern unit formed on a glass substrate comprises an opaque thin film portion with an identification mark formed on a blank portion of and not in the display and terminal thereof. The opaque thin film portion with an identification mark is not coated with another opaque thin film thereon and is coated with a transparent film thereon so that the identification mark can be visually observed from the surface of the device.

3 Claims, 3 Drawing Sheets

ACTIVE MATRIX LIQUID CRYSTAL DISPLAY WITH IDENTIFICATION MARK IN THE LOWER OPAQUE CONDUCTIVE FILM

This application is a division of application Ser. No. 07/731,421, filed Jul. 17, 1991 now abandoned.

BACKGROUND OF THE INVENTION

The present invention relates to a liquid crystal display device, and in particular to a liquid crystal display device in which an identification mark is provided on a glass substrate.

Related Art

Conventional liquid crystal display devices have been provided with a predetermined model number representative of the model number of the product together with a fixed display pattern of the product. On the other hand, a lot of liquid crystal devices ranging from a conventional segment type and simple dot matrix type to an active matrix type have been sold on the open market. Since the active matrix type devices have a large display capacity which meet various needs, a lot of devices which have the same product model number are put on the market and have begun to be used for various application products having the display devices. This implies that the active matrix type liquid display devices are more favorable as ready-made products than custom-made-products.

Therefore, tracing products by relying on only on the convention model numbers of the products is difficult, after the products have been put on the market. Although the active matrix type devices have been put on the market, the productivity of them is low. It is difficult to provide the products of the same model number with a uniform reliability specification as well as uniform performance specification. There is a need for an increase in tracability in the market for responding to product claims and for enhancing the product control in the course of production in order to improve the industrial yield.

One approach to solving such problems is to provide an identification mark in the course of a production process, the mark to be effectively used for production control. One example of such a mark will be described with reference to FIGS. 1, 2 and 3.

FIG. 1 is a schematic plan view showing the reverse side of an active device's substrate, which is in the course of a conventional production process for active matrix type liquid crystal display devices. Various patterned thin films are provided on the surface of a glass substrate 1 to provide an active device. The pattern on the surface is visually observed from the reverse side of the device. Various thin films are multi-layered on the glass substrate and a thin film laminated area 2, which is not used because the device does not appear in the periphery of the substrate.

The thin film laminated area 2 corresponds to an area in which a photo-resist remains as an unexposed portion when the device pattern 3 is patterned. Therefore, most of the used thin films remain under a condition that they are laminated in the as-formed order. A numeral 20 shows a standard corner.

The product identification mark may be provided by using the thin film laminated area 2. FIG. 2 is a partial enlarged plan view of an identification mark 5. In FIG. 2, numerals and character "9B12" is not a product model number, but is a production lot number. When a lowermost opaque film is patterned by means of a handy spot exposing device by using a photo-resist and a light transmitting film bearing such a character array, an exposure is performed as an additional step by using the character array as negative original. The identification mark portion 4 is then etched simultaneously with the etching of the device pattern portion 3 so that each glass substrate for active device can be numbered. The character array 6 can be visually observed when a spot exposing portion 5 on the reverse side of the glass substrate 1 is observed. The character array 6 can be used as the identification mark.

The structure of the identification mark portion 4 in the above-mentioned prior art liquid crystal display device has various disadvantages as follows;

FIG. 3 is a schematic sectional view showing a glass substrate 1 of the marking-character portion of the spot exposed portion 5. The lower metal film 7 which provides a gate wiring for thin film transistors formed on the surface of the glass substrate 1 is provided with a character array pattern shown in FIG. 2. However, a lower insulating layer 8, a semiconductor layer 9, an upper metal layer 10 and an upper insulating layer 11 which are successively formed to provide a thin film transistor array remain on the lower metal film 7 as they are laminated. Therefore, it is disadvantage that the character array 6 of the identification mark portion 4 should be always viewed from the reverse side 12 of the glass substrate. Frequent turning of the glass substrate upside down causes a poor productivity and may lower the yield due to dust.

Since the semiconductor layer 9 can be seen, the contrast between the spot exposed portion 9 and the lower metal layer 7 is bad, and use of a sensor device is difficult although the spot exposed portion 5 can be seen by eyes of human being.

The critical disadvantage is that the device pattern portion 3 cannot be provided with the identification mark portion 4 due to problems of dimension, precision and dusts since a manual spot exposure is performed. If the glass substrate 1 manufactured with a plurality of device pattern portions 3 is individually cut into discrete devices and since unnecessary thin film laminated portion 2 is cut out, no identification mark exists on the device. Manual control of correspondence between the identification mark and the cut away product is difficult.

SUMMARY OF THE INVENTION

It is an object of the present invention to provide a liquid crystal display device in which an identification mark can be readily viewed from the surface thereof so that control of product such as process control and reliability control can be sufficiently achieved.

In order to accomplish the above-mentioned object, the present invention provides an active matrix type liquid display device including a display pattern unit formed on a glass substrate, comprising an identification mark portion formed on a blank portion of said display pattern unit excepting display and terminal areas thereof, said identification mark portion including an opaque thin film provided with identification mark and formed on said glass substrate, said opaque thin film with identification mark being coated with a transparent thin film thereon.

The identification mark portion is formed inside of a cutting line for separating individual devices provided on the glass substrate.

The opaque thin film provided with the identification mark is a lower metal film formed immediately upper side of the glass substrate.

The identification mark includes a bar code in addition to the identification characters.

The identification mark portion is formed of the opaque thin film provided with the indentification mark by using, for example, a lot of the lower metal wires formed immediately below the glass substrate in the blank portion excepting the display area and the terminal area of the display pattern portion. Only the transparent thin film is formed on the opaque thin film area with the identification mark.

Accordingly, the identification mark can be confirmed from the surface of the device so that the control of the device is facilitated. Each discrete device can be added with the identification mark by forming the identification mark portion inside of the cutting line of the device to facilitate the control of the reliability of the devices.

Control of the devices can be further facilitated by marking a bar code as the identification mark in combination with the character pattern.

DESCRIPTION OF THE PREFERRED EMBODIMENTS

Now, the embodiments of the present invention will be described with reference to drawings.

Figure 1:
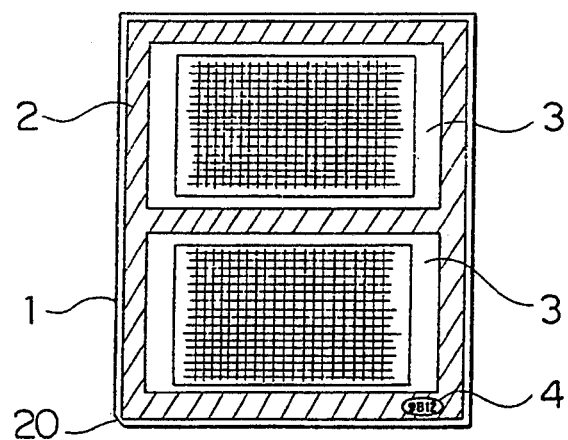
FIG. 1 is a schematic plan view showing the reverse side of a glass substrate for an active matrix which is in the course of a process for manufacturing a prior art liquid crystal display device.
Figure 2:
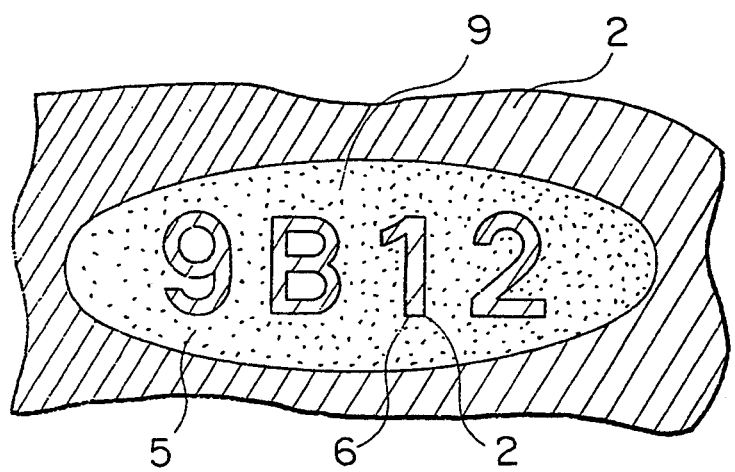
FIG. 2 is a partial enlarged plan view showing the identification mark portion in FIG. 1.
Figure 3:
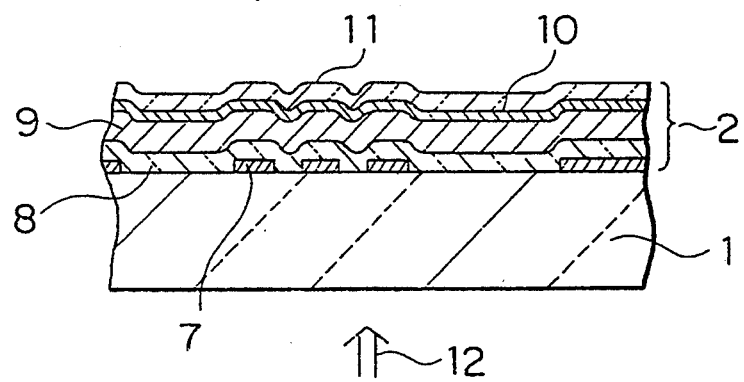
FIG. 3 is a schematic sectional view showing the marking character portion in FIG. 2.
Figure 4:
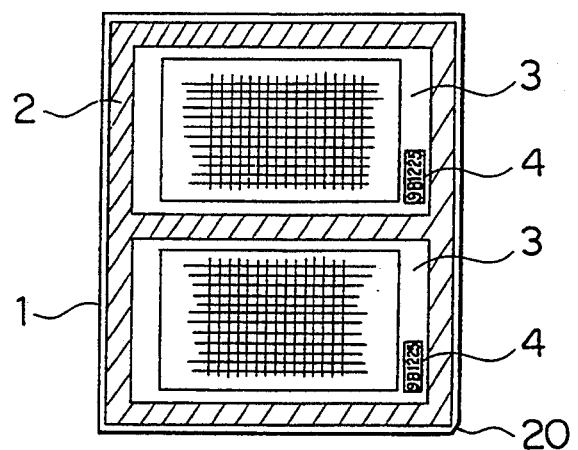
FIG. 4 is a schematic plan view showing the surface of a glass substrate for an active matrix which is in the course of a process for manufacturing a liquid crystal device which is a first embodiment of the present invention.

FIG. 4 is a schematic plan view showing the surface of a glass substrate for an active matrix which is in the course of a the manufacturing of liquid crystal display device which is a first embodiment of the present invention. The surface of the glass substrate 1 has with various patterned thin films for providing active devices, as is similar to prior art. The pattern can be, of course, viewed as shown in FIG. 4 if the display is observed from the direct observing side 15 which is opposite to the conventional direct observing side 12. A thin film laminated area 2 similarly exists on the periphery of the substrate on the glass substrate 1. This laminated portion 2 is not provided with any product identification mark. An area on which photo-resist working is performed in the course of usual manufacturing process of a device pattern portion 3 is used to provide a blank portion excepting a display area (matrix array area) and a terminal area with an identification marking portion 4.

Figure 5:
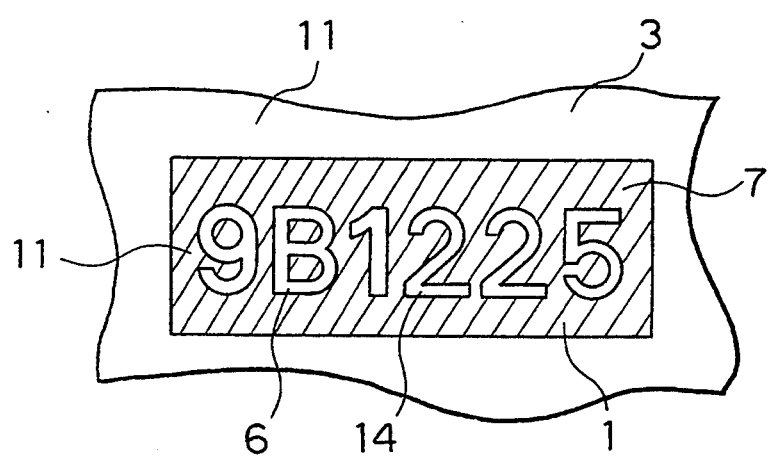
FIG. 5 is a partial enlarged plan view showing an identification mark portion of FIG. 4.

FIG. 5 is a partial enlarged plan view of the identification marking portion 4. A character pad 13 is formed of a first laminated opaque thin film in the blank portion of the device pattern portion 3. An additional pattern is thus provided in a first opaque thin film pattern forming exposure mask. The character pad 13 is rectangular in shape in FIG. 5. The shape of the pad 13 is optional, provided that the pad 3 has an area necessary for the identification mark. The character pad 13 is a lower metal film 7 made of a chromium metal film for wiring the gates of thin film transistors. The metal film 7 is a first opaque thin film. The blank portion is formed around the character pad 13. The thin film laminated portion 2 and the other opaque film are not formed therearound.

The marking of characters which will become the identification mark like character array 6 on the character pad 13 may be performed before and after the patterning of the first opaque thin film. It is preferable to mark the characters on predetermined positions immediately after forming the film which is an upstream step in the manufacturing process control. Marking is performed by means of laser marking apparatus. Blanked marking characters 14 are formed by sputtering the chromium film by impinging a laser thereon to make a character array 6. The laser marking apparatus comprises a stage system for determining marking positions and a beam scanning system for determining the kind of marks. Both systems are operated under control of a computer. The accuracy of the size, kind and position of the identification marks is thus high. Since the chromium which is sputtered by the laser becomes gaseous, dusts which cannot be removed by washing the glass substrate 1 will not be deposited. Alternatively, an exposing device having a numbering capability may be used in lieu of the laser marking apparatus and a numbering plate which is overlapped on the first opaque thin film pattern mask may be used to perform a simultaneous patterning of the characters.

Figure 6:
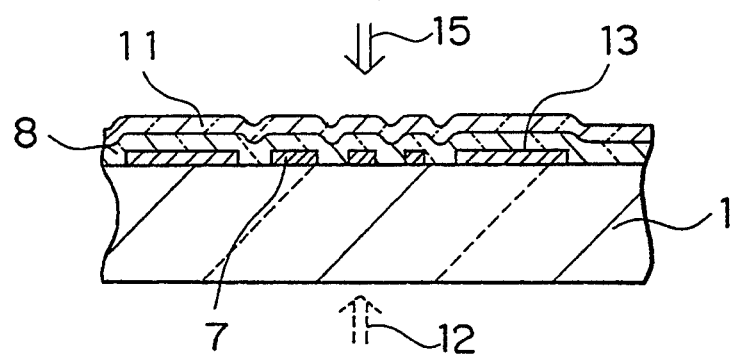
FIG. 6 is a schematic sectional view showing a marking character portion of FIG. 5.

FIG. 6 is a schematic partial sectional view of the marking characters 14 of FIG. 5. The character pad 13 made of the lower metal film 7 to be marked is marked with marking characters by being bored. No opaque thin film is laminated on the character pad 13 excepting the lower metal film 17 which is the first opaque thin film with mirror surface. Only lower and upper insulating films 8 and 11 are laminated on the pad 13. The lower and upper insulating films 8 and 11 generally often serve as a field insulating layer and a passivation film of the entire of the element and remain as the pattern blank portion. However, since these insulating films are made of a transparent film such as silicon oxide layer, silicon nitride layer, the face side can be made the direct viewing side 15 which has the mirror surface of the character pad 13 as well as the reverse side which is conventional direct viewing side 12.

A feature of the present invention resides in an active matrix type liquid display device including a display pattern unit 3 formed on a glass substrate, comprising an indentification mark portion 4 formed on a blank portion of said display pattern unit excepting display and terminal areas thereof, said identification mark portion including a lower metal film 7 which is an opaque thin film provided with an identification mark and formed on said glass substrate, said opaque thin film with identification marks being coated with only the lower and upper insulating layers 8 and 11, as a transparent thin film as shown in FIGS. 4, 5 and 6.

In the first embodiment, by providing such a light transmitting identification mark, contrast of the mark can be enhanced so that the mark can be visually viewed by a human being and by sensor devices. Many of the sensor devices use lights visual red light and near-infrared lights in the range of about 600 nm to about 1000 nm. The glass substrate 1 is made of borosilicate glass. The light transmission factor of the silicon oxide or silicon nitride film is about 90% for lights having wave length not less than 350 nm. On the other hand, the film of chromium used for gate wiring is about 1500 Å in thickness and hardly transmits these lights. The transmission factor of polysilicon and amorphous silicon used as a semiconductor film is low. Therefore, the mark can be read at high contrast from both the face and reverse sides using a reflection or transmission detection method if an optical sensor is used.

Figure 7:
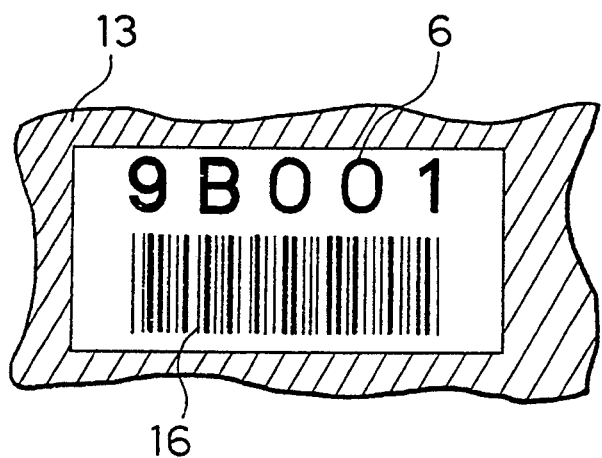
FIG. 7 is a partial enlarged plan view of an identification mark portion of a liquid crystal device which is a second embodiment of the present invention.

Referring now to FIG. 7, there is a schematic plan view showing an enlarged character pad portion, a second embodiment of the present invention. The second embodiment is substantially identical with the first embodiment except that identification marks are not blanked, but are left and bar code 16 is provided. In the second embodiment, the laser marking device may be used and the bar code 16 which is a feature of the present invention is provided in addition to visual reading character array 6 so that a bar code reader may be used as a sensor device.

The bar code 16 in FIG. 7 is marked in accordance with "code 39". The character array 6 is an abbreviation of a start and stop mark * (asterisk). The bar code may be marked in accordance with the other bar code system. The bar code is not limited to the positive leaving pattern and may be read by a signal-processing. If the size of the characters of the character array 6 is enlarged in such a manner, a considerable width of the character pad is necessary. If the characters are considered as a subsidiary of the bar code in addition to a fact that the characters are read by OCR. The height of the characters may be made smaller to 2 mm so that it becomes convenient to provide the character array in the blank portion of the device pattern unit 3.

Although the lower metal film 7 is made of chromium for gate wiring and constitutes the character pad 13, the character pad 13 is not limited to chromium for gate wiring depending upon the type of thin film transistors and the kind of active switching elements. The character pad 13 may be formed of a single opaque thin film (two laminated opaque thin films which are continuous are considered as functionally single film) independently of any type transistors and switching elements.

Figure 8:
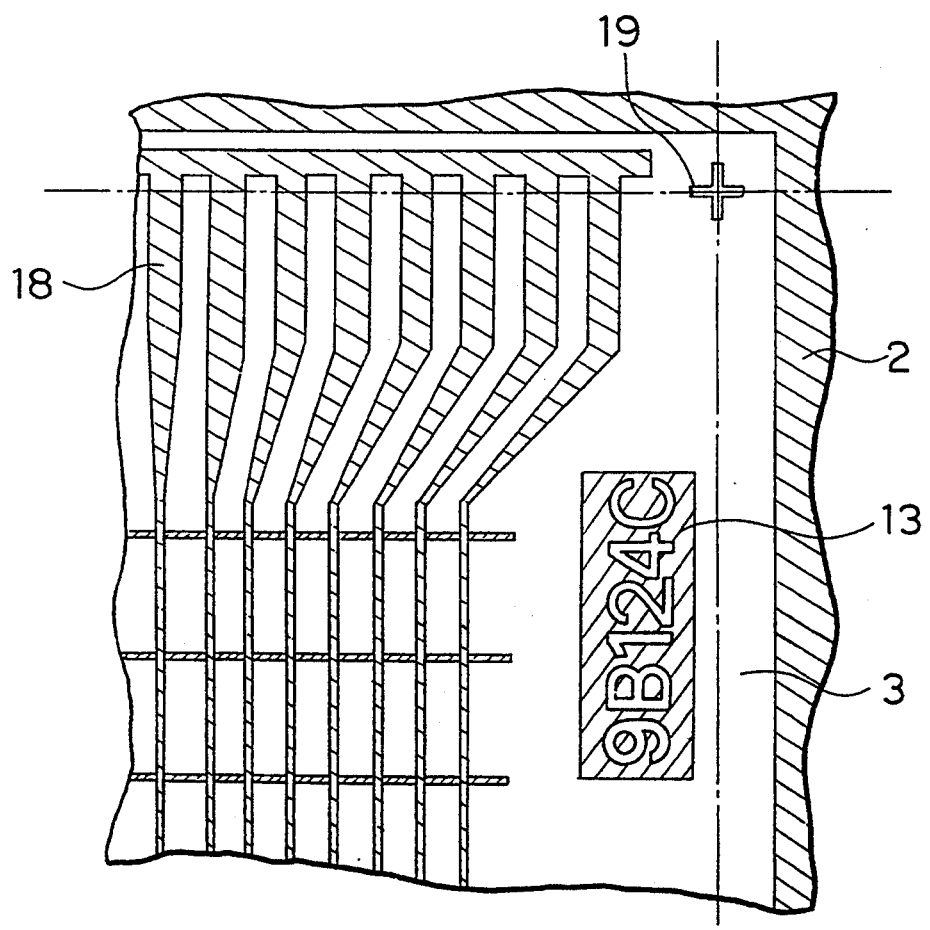
FIG. 8 is a partial enlarged plan view showing the surface of a glass substrate for an active matrix of a liquid crystal device including an identification mark portion, which is a third embodiment of the present invention.

Referring now to FIG. 8, there is shown a schematic plan view showing a third embodiment of the present invention. In this embodiment, the character pad 13 is formed on a blank portion of the device pattern unit 3 excepting a display area 17 and a terminal area 18, inside of a cutting line passing through cutting marks 19 which is one of the features of the present invention. The character pad 13 is formed by laser marking in a blanking mode so that the OCR characters are 2 mm in height. If the use of a sensor device in case of OCR as well as case of bar code is considered, the number of digits of the marks can be made larger than the digits of a manual control which is relying upon a visual observation. Accordingly, each of all products can be provided with an identification number. Even a combination of a product model number and a product serial number can be provided.

Providing the character pad 13 inside of the cutting mark 19 makes anumbered identification mark to be left on each product even if the device is cut along the cutting line to provide individual products. Field tracing is possible based upon the identification mark after the products have been shipped on the market. An uniform control of the products is possible inside and outside of a factory by using the identification marks.

As mentioned above, in accordance with the present invention, a character pad bearing an identification mark is formed of a lower opaque thin film used for forming the device in a device pattern unit and the identification mark is marked on the pad and the other opaque thin film is not provided in the character pad. It is thus possible to identify the mark even from the side of a glass substrate so that a reversing of the substrate is eliminated. As a result of this, a complicated and labor intensive work is eliminated and lowering of yield due to a generation of dust is not introduced. Further, contrast of for a reading sensor as well as visual observation can be enhanced so that there is an advantage that a process control using sensor devices becomes possible. Since the character pad is provided inside (on the element side) the cutting marks for individually separating a multiplicity of display devices provided on the same glass substrate, an identification mark can be left on the product. Control of a product lot, production serial and product model can be easily achieved so that the tracability of products inside and outside of factory is enhanced.

Since the character pad is made of a thin film which is made in the course of device manufacturing process and patterning of the character pad can be performed simultaneously with that of the thin film, no additional step is advantageously required. Numbering using a laser marking apparatus or a numbering blade of a device pattern exposing apparatus may reduce or not increase the number of steps, in contrast with the prior art numbering step using spot exposure. The position of the identification mark is more preferable for automatic manufacturing process than manual manufacturing process, resulting in a high productivity.

What is claimed is:

1. A method for producing a liquid crystal display panel, comprising the steps of:
   preparing a glass substrate having a device pattern portion and a peripheral portion surrounding said device pattern portion, said device pattern portion including a matrix array area portion and a blank portion, said blank portion containing an identification marking portion;
   forming a lower opaque conductive film on said matrix array area portion and on said identification marking portion of said blank portion;
   patterning the lower opaque conductive film formed on said matrix array area portion to form gates for active devices to be provided on said matrix array area portion;
   selectively removing the lower opaque conductive film formed on said identification marking portion of said blank portion to form an identification number on said identification marking portion;

selectively forming in sequence at least an insulating film, a semiconductor layer and an upper opaque conductive film on said matrix array area portion to form said active devices on said matrix array area portion, said insulating film being formed at least in part over said identification marking portion in order to cover said identification number, said semiconductor layer and said upper opaque conductive film being positioned away from said identification marking portion so that said identification number if free from being covered with said semiconductor layer and said upper opaque conductive film; and cutting said glass substrate to separate said device pattern portion and said peripheral portion.

2. A method for producing a liquid crystal display panel, comprising the steps of:

preparing a glass substrate having a device pattern portion and a peripheral portion surrounding said device pattern portion, said device pattern portion including a matrix array area portion and a blank portion, said blank portion having an identification marking portion;

forming a lower opaque conductive film on said matrix array area portion and on said identification marking portion of said blank portion;

patterning the lower opaque conductive film formed on said matrix array area portion to form gates for active devices to be provided on said matrix array area portion;

carrying out a laser marking on the lower opaque conductive film formed on said identification marking portion in order to form an identification number on said identification marking portion;

selectively and sequentially forming at least an insulating film, a semiconductor layer and an upper opaque conductive film on said matrix array area portion to form said active devices on said matrix array area portion, said insulating film being positioned over said identification marking portion in order to cover said identification number, said semiconductor layer and said upper opaque conductive film being positioned away from said identification marking portion so that said identification number is free from being covered with said semiconductor layer and said upper opaque conductive film; and cutting said glass substrate to separate said device pattern portion and said peripheral portion.

3. A method for producing a liquid crystal display panel, comprising the steps of:

preparing a glass substrate having first and second device pattern portions and a peripheral portion surrounding said first and second device pattern portions, each of said first and second device pattern portions including a matrix array area portion and a blank portion, said blank portion having an identification marking portion thereon;

forming a lower opaque conductive film on said matrix array area portion and on said identification marking portion or each of said first and second device pattern portions;

patterning the lower opaque conductive film formed on said matrix array area portion of each of said first and second device pattern portions in order to form gates for active devices to be provided on said matrix array area portion of each of said first and second device pattern portions;

carrying out a laser marking on the lower opaque conductive film formed on said identification marking portion of each of said first and second device pattern portions in order to form an identification number on said identification marking portion of each of said first and second device pattern portions;

selectively and sequentially forming at least an insulating film, a semiconductor layer and an upper opaque conductive film on said matrix array area portion of each of said first and second device pattern portions in order to form said active devices on said matrix array area portion of each of said first and second device pattern portions, said insulating film being positioned over said identification marking portion of each of said first and second device pattern portions to cover said identification number of each of said first and second device pattern portions, said semiconductor layer and said upper opaque conductive film being positioned away from said identification marking portion of each of said first and second device pattern portions to make said identification number of each of said first and second device pattern portions free from being covered with said semiconductor layer and said upper opaque conductive film; and cutting said glass substrate to separate said first and second device pattern portions from each other and from said peripheral portion.

* * * * *